(12) United States Patent
Morgan et al.

(10) Patent No.: US 8,949,862 B2
(45) Date of Patent: Feb. 3, 2015

(54) RATE OF OPERATION PROGRESS REPORTING

(71) Applicant: International Business Machines Corporation, Armonk, NY (US)

(72) Inventors: Edward T. Morgan, Issaquah, WA (US); Shawn M. Waters, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 13/748,451

(22) Filed: Jan. 23, 2013

(65) Prior Publication Data

US 2014/0208324 A1 Jul. 24, 2014

(51) Int. Cl.
*G06F 3/00* (2006.01)
*G06F 9/46* (2006.01)

(52) U.S. Cl.
CPC ................................ *G06F 9/466* (2013.01)
USPC ............................ 719/320; 719/313; 718/101

(58) Field of Classification Search
CPC ........ G06F 21/552; G06F 9/465; G06F 9/466
See application file for complete search history.

(56) References Cited

U.S. PATENT DOCUMENTS

| 6,058,378 | A | 5/2000 | Clark et al. |
|---|---|---|---|
| 7,603,300 | B2 | 10/2009 | Haffner et al. |
| 2003/0135354 | A1* | 7/2003 | Gabele et al. .................... 703/13 |
| 2006/0230306 | A1* | 10/2006 | Richards et al. .................. 714/7 |
| 2010/0251160 | A1* | 9/2010 | Shafi et al. ...................... 715/772 |
| 2011/0016214 | A1* | 1/2011 | Jackson ......................... 709/226 |
| 2012/0215589 | A1 | 8/2012 | Tavares et al. |
| 2014/0201747 | A1* | 7/2014 | Pattnaik et al. ............... 718/101 |

\* cited by examiner

*Primary Examiner* — Tuan Dao
(74) *Attorney, Agent, or Firm* — James L. Baudino (57) ABSTRACT

According to one aspect of the present disclosure, a method and technique for rate of operation progress reporting is disclosed. The method includes: responsive to completion by an application of one or more batch operations, storing an operation count corresponding to each completed batch operation; and, responsive to being polled by a monitoring module: identifying a time reporting window for the batch operations; and reporting a rate of progress meter value for the batch operations to the monitoring module based on the operation counts and the time reporting window.

18 Claims, 5 Drawing Sheets

RATE OF OPERATION PROGRESS REPORTING

BACKGROUND

In computer systems, event counters are often implemented to enable monitoring of the behavior and performance of system parameters. A counter corresponding to each operation/event to be monitored is incremented each time that operation/event has been completed. Monitoring software polls the values of these counters, producing snapshots that illustrate over time what operations/events the system has completed. The monitoring software usually performs polling of these values on a set interval determined by the performance analyst or system administrator running the monitoring software. The number of operations/events performed during the interval may then computed by subtracting the count returned in the previous poll from the current value, and then the average rate over the interval can be computed by dividing by the length of the polling interval.

BRIEF SUMMARY

According to one aspect of the present disclosure a method and technique for rate of operation progress reporting is disclosed. The method includes: responsive to completion by an application of one or more batch operations, storing an operation count corresponding to each completed batch operation; and, responsive to being polled by a monitoring module: identifying a time reporting window for the batch operations; and reporting a rate of progress meter value for the batch operations to the monitoring module based on the operation counts and the time reporting window.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method and technique for rate of operation progress reporting. For example, in some embodiments, the method and technique includes: responsive to completion by an application of one or more batch operations, storing an operation count corresponding to each completed batch operation; and, responsive to being polled by a monitoring module: identifying a time reporting window for the batch operations; and reporting a rate of progress meter value for the batch operations to the monitoring module based on the operation counts and the time reporting window. Embodiments of the present disclosure enable batch operations to be reported using a floating time reporting window, thereby indicating a smoothed rate of progress value for the reported operations. For example, an application may be instrumented with code defining a particular time reporting window to be used for a particular event/operation to be monitored. The time reporting window may be varied for each particular event/operation to be monitored. In response to being polled by a monitoring module for an updated event/operation count/value, the instrumented application uses the time reporting window (e.g., instead of the interval from the last poll by the monitoring module) to compute a rate of progress meter value for the batch operations. Operation/event counts completed at a time earlier than the current time minus the time reporting window are discarded, and the remaining operation/event counts are summed. The summed value is then divided by the time reporting window (or the operating time of the application if less). Thus, embodiments of the present disclosure may effectively form a larger, fixed reporting window for batch operations than an interval used by an independent monitoring application, thereby providing more consistent results for a rate at which batch operations are being processed.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
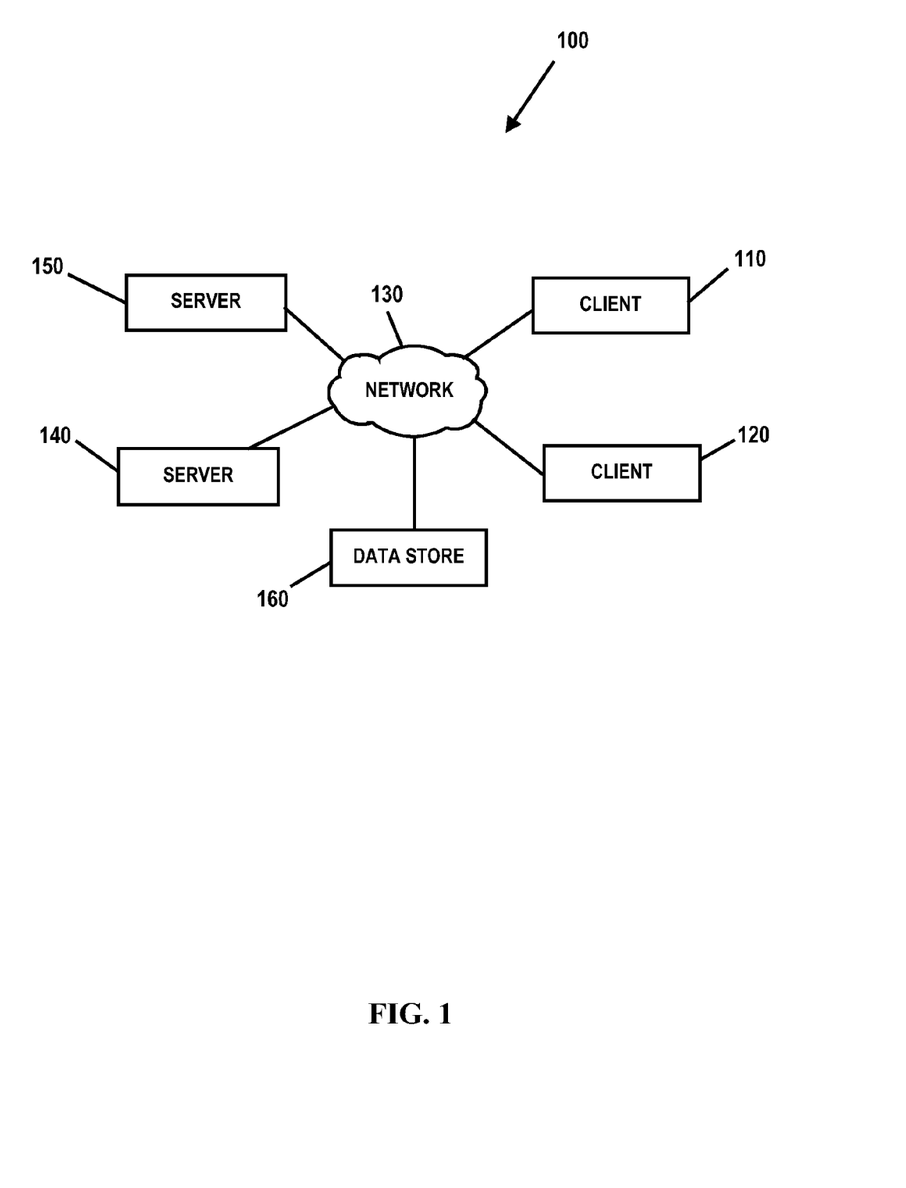
FIG. 1 is an embodiment of a network of data processing systems in which the illustrative embodiments of the present disclosure may be implemented.
Figure 2:
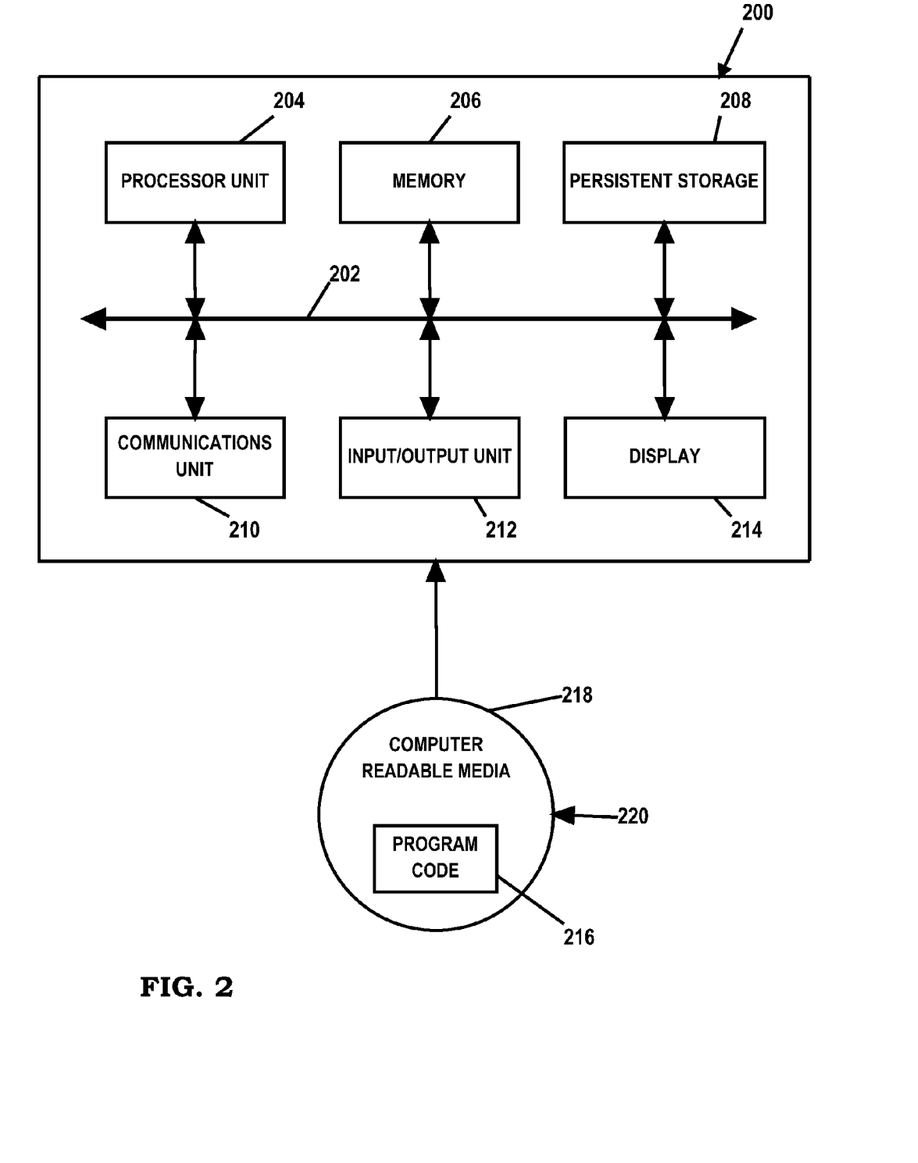
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for rate of operation progress reporting according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
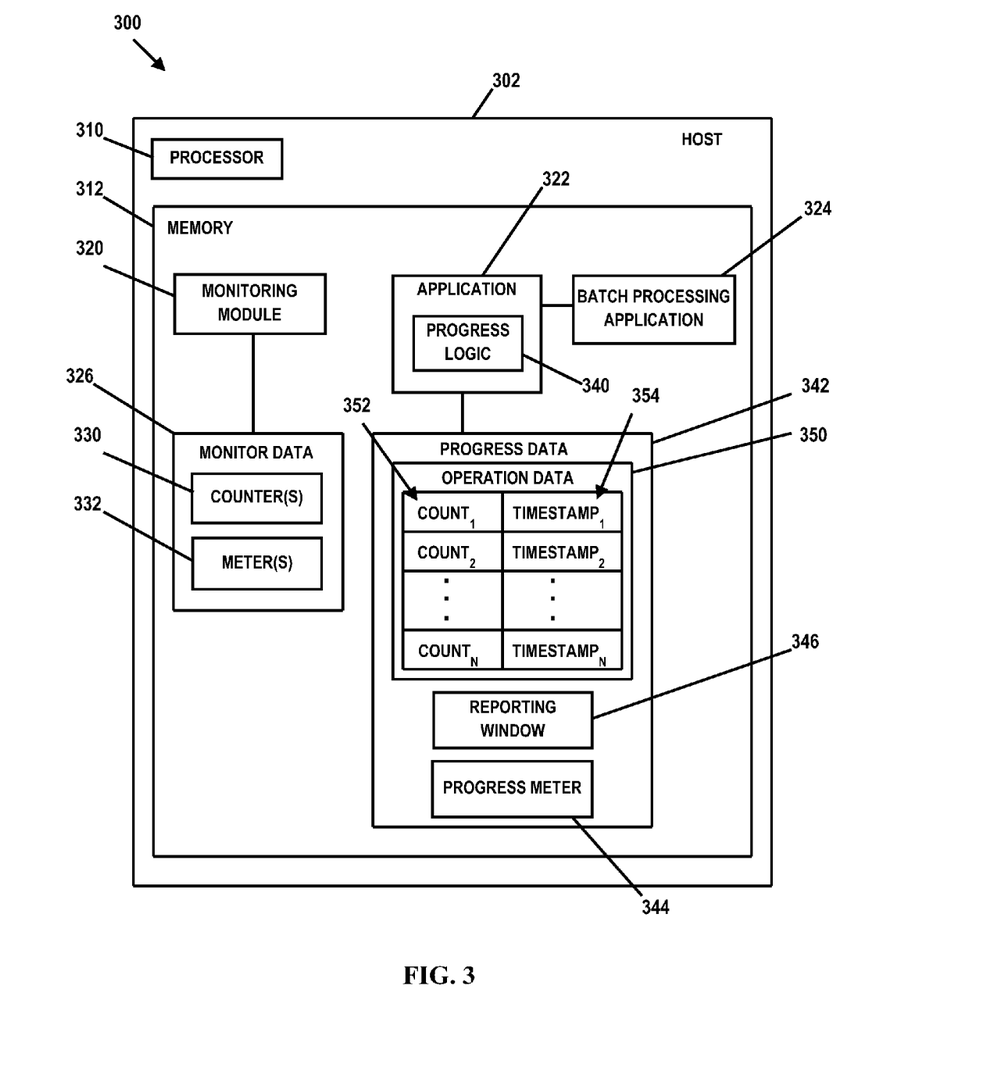
FIG. 3 is a diagram illustrating an embodiment of a data processing system for rate of operation progress reporting in which illustrative embodiments of the present disclosure may be implemented.

FIG. 3 is an illustrative embodiment of a system 300 for rate of operation progress reporting. System 300 may be implemented on data processing systems or platforms such as, but not limited to clients 110 and/or 120, system 200, or at other data processing system locations. In the embodiment illustrated in FIG. 3, system 300 comprises a host 302 (such as client 110 and/or system 200) having a processor unit 310 and a memory 312. In FIG. 3, memory 312 includes a monitoring module 320, an application 322 and a batch processing application 324. In FIG. 3, for ease of illustration and description, monitoring module 320, application 322 and batch processing application 324 are depicted as residing on a single host or data processing system. However, it should be understood that monitoring module 320, application 322 and/or batch processing application 324 may reside on multiple, different and/or discrete hosts or data processing systems. Monitoring module 320, application 322 and/or batch processing application 324 may be implemented in any suitable manner using known techniques that may be hardware-based, software-based, or some combination of both. For example, monitoring module 320, application 322 and/or batch processing application 324 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Monitoring module 320 is configured to monitor and/or report the behavior and/or performance of data processing system operations. For example, monitoring module 320 may comprise and/or have access to a library and/or be otherwise configured to collect various types of monitored behavior data 326. In the illustrated embodiment, monitoring module 320 may collect and/or otherwise derive counter data 330 and meter data 332 corresponding to monitored operations. Counter data 330 may comprise one or more counters having values that are incremented each time a monitored operation is completed. For example, monitoring module 320 may poll a monitored application (e.g., application 322) periodically and/or according to a predefined schedule/interval to collect data corresponding to completed operations. The number of operations performed during the interval may then be computed by subtracting the current counter value from a previous interval counter value. An average operation rate may then be computed by dividing the resulting counter value by the time interval. Meter data 332 may comprise a meter value representing a rate of operation processing.

Application 322 may comprise any type of application of which its behavior and/or operation(s) is desired to be monitored. As an example, application 322 may comprise a document management application that submits documents/jobs to batch processing application 324 (e.g., an indexing engine) that performs full text indexing of such documents, thereby enabling such documents to text-searchable. For example, application 322 may submit large transactions and/or batched job transactions to processing application 324 for processing (e.g., 100 documents/jobs at a time). As processing application 324 completes operations on the job batch, application 322 may update a counter based on the batch completion (e.g., incrementing a counter corresponding to completed job operations by 100). As indicated above, monitoring module 320 may periodically poll application 322 and/or a corresponding counter library (e.g., counter data 330) to update and/or report the operation monitoring data. It should be understood that application 322 may comprise any type of application and/or process having operations that are desired to be monitored. Further, in the illustrated embodiment, the operation that may be monitored may be performed by a different application (e.g., processing application 324) than the application that monitors and/or reports such operations (e.g., application 322). However, it should be understood that the process and/or functions described herein may be performed by a single application (e.g., application 322).

As described above, monitoring module 320 may periodically poll the counter 330 values associated with monitored operations. However, if an operation begins near the end of a measurement/polling interval and completes after that measurement/polling interval, then these work/operations will be counted as having been performed in the later polling interval. Although this scenario may slightly skew the monitoring results, as long as the duration of each operation is small compared to the polling interval, the inaccuracy will be small. However, in some applications, to increase efficiency, some operations are performed in large batches (e.g., combining several database operations into a single round trip to the database). While such a batch of operations is in progress, the initiating application will typically be waiting until such time that the batch has completed. Upon the batch completing, the operation counter will be incremented by the size of the batch since that many operations have now been completed. For example, suppose a batch size of 100 is being used. During such operation processing, instead of incrementing an event counter one by one, the counter will remain at the same value until the entire batch completes, at which time the event counter will be incremented by 100 all at once. This may cause an increased monitoring inaccuracy. For example, the operation/event counter associated with such operations may see the following operation counts across five successive polling intervals: 0, 0, 0, 0, 100. Thus, even though some of these operations were being performed across all five polling intervals, the resulting counter values may not reflect accurate performance monitoring.

Embodiments of the present disclosure provide a moving or floating average for the computation of a rate of progress for extended time period batched operations (e.g., operations having a quantity and/or processing time such that the entire completion of the batched operations may not occur until after one or more subsequent monitoring polling intervals). In the embodiment illustrated in FIG. 3, application 322 comprises progress logic 340 which may comprise logic, code and/or instructions for reporting a rate of batch operation completion utilizing a moving or floating time reporting window. For example, in the illustrated embodiment, application 322 may be instrumented with code/instructions for computing and/or otherwise reporting rate of progress data 342, such as a rate of progress meter 344 value, utilizing a defined time reporting window 346. Reporting window 346 may be set/defined for each event/operation desired to be monitored. Reporting window 346 defines a larger, fixed reporting interval for the batched operations independent of the polling interval of monitoring module 320. Progress logic 340 is used to compute a number of completed events/operations within the reporting window 346, divided by the amount of time of the reporting window 346, to thereby provide a smoothed rate of progress value to report to monitoring module 320.

In some embodiments, progress logic 340 is configured to log, monitor and/or otherwise track a number of completed events/operations along with a time when such events/operation completed. For example, in the embodiment illustrated in FIG. 3, progress logic 340 may comprise and/or otherwise collect operation data 350 comprising a series of operation counts 352 and a timestamp 354 corresponding to each operation count. Operation count 352 may comprise an event/operation count value of the monitored events/operations. In response to being polled by monitoring module 320, progress logic 340 may use reporting window 346 to compute/derive a rate of progress meter 344 value for the monitored operation. In this embodiment, for example, in response to being polled by monitoring module 320 for current monitored values, progress logic 340 determines the operation counts 352 within the current reporting window 346, sums and/or aggregates the identified operation counts 352, and divides the summed/aggregated operation counts 352 by the amount of time of the reporting window 346 to obtain the rate of progress meter 344 value. This derived rate of progress meter 344 value is then reported to monitoring module 320 for the current polled interval of the monitoring module 320 (e.g., as a number of operations per unit of time). Progress logic 340 may also be configured to monitor, track and/or record minimum and/or maximum rate of progress meter 344 values over the operational duration of application 322 (e.g., comparing each current progress meter 344 value with previous minimum/maximum progress meter 344 values).

Figure 4:
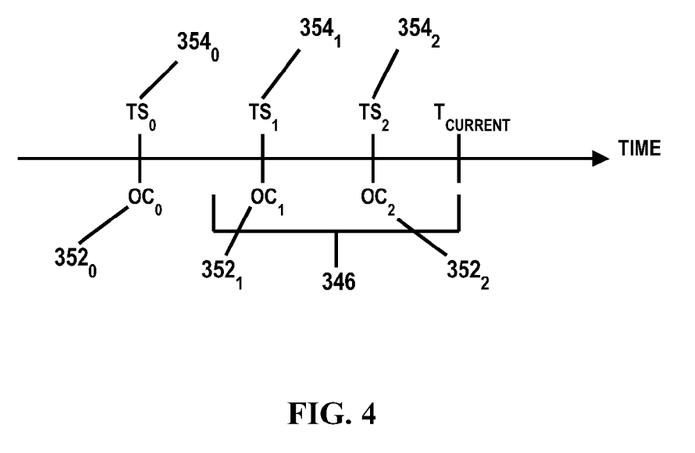
FIG. 4 is a diagram illustrating the operation of batch operation progress reporting according to an embodiment of the present disclosure.

FIG. 4 is a diagram illustrating operation of progress logic 340 in connection with application 322 for rate of operation progress reporting. In FIG. 4, a number of operation counts 352 have been recorded each with an associated timestamp 354. For example, in FIG. 4, operation counts $OC_0$, $OC_1$ and $OC_2$ (indicated by references $352_0$, $352_1$ and $352_2$) represent completed events/operations occurring at respective timestamps $TS_0$, $TS_1$ and $TS_2$ (indicated by references $354_1$, $354_2$ and $354_3$) related to application 322. In FIG. 4, $T_{CURRENT}$ represents the current time of polling by monitoring module 320. Process logic 340 computes a rate of progress meter 344 value by discarding operation counts having a timestamp or occurring earlier than the current time minus the time of the reporting window 346. In the example of FIG. 4, process logic 340 would discard the value of $OC_0$ as the value of $OC_0$ has a timestamp occurring earlier than $T_{CURRENT}$ minus the time reporting window 466. Process logic 340 takes the remaining operation counts not occurring earlier than the current time minus the time of the reporting window 346 (e.g., $OC_1$ and $OC_2$) and sums the values. Progress logic 340 then divides the resulting sum of operation counts by the time of the reporting window 346. Thus, in this example, if the value of each of $OC_1$, $OC_2$ and $OC_3$ is 100, and the time reporting window is 8 minutes, $OC_1$ would be discarded, the values of $OC_2$ and $OC_3$ would be summed (resulting in a value of 200), and the resulting value would be divided by 8 minutes, thereby resulting in a rate of progress meter 344 value of 25 operations per minute. Thus, the rate of progress meter 344 value is normalized to a desired/fixed unit of time.

In some embodiments, the summed event/operation counts that fall within the reporting window 346 from the current or polled time may be divided by the lesser of the time reporting window 346 or the operating time of application 322. For example, in some embodiments, to avoid misreporting of a rate of progress meter 344 value that may otherwise be caused during early operation of application 322 (e.g., if the operating time of application 322 is less than the time period of reporting window 346), progress logic 340 may divide the summed operation counts 352 falling within the time reporting window 346 by the lesser of the time reporting window 346 or the operating time of application 322.

Figure 5:
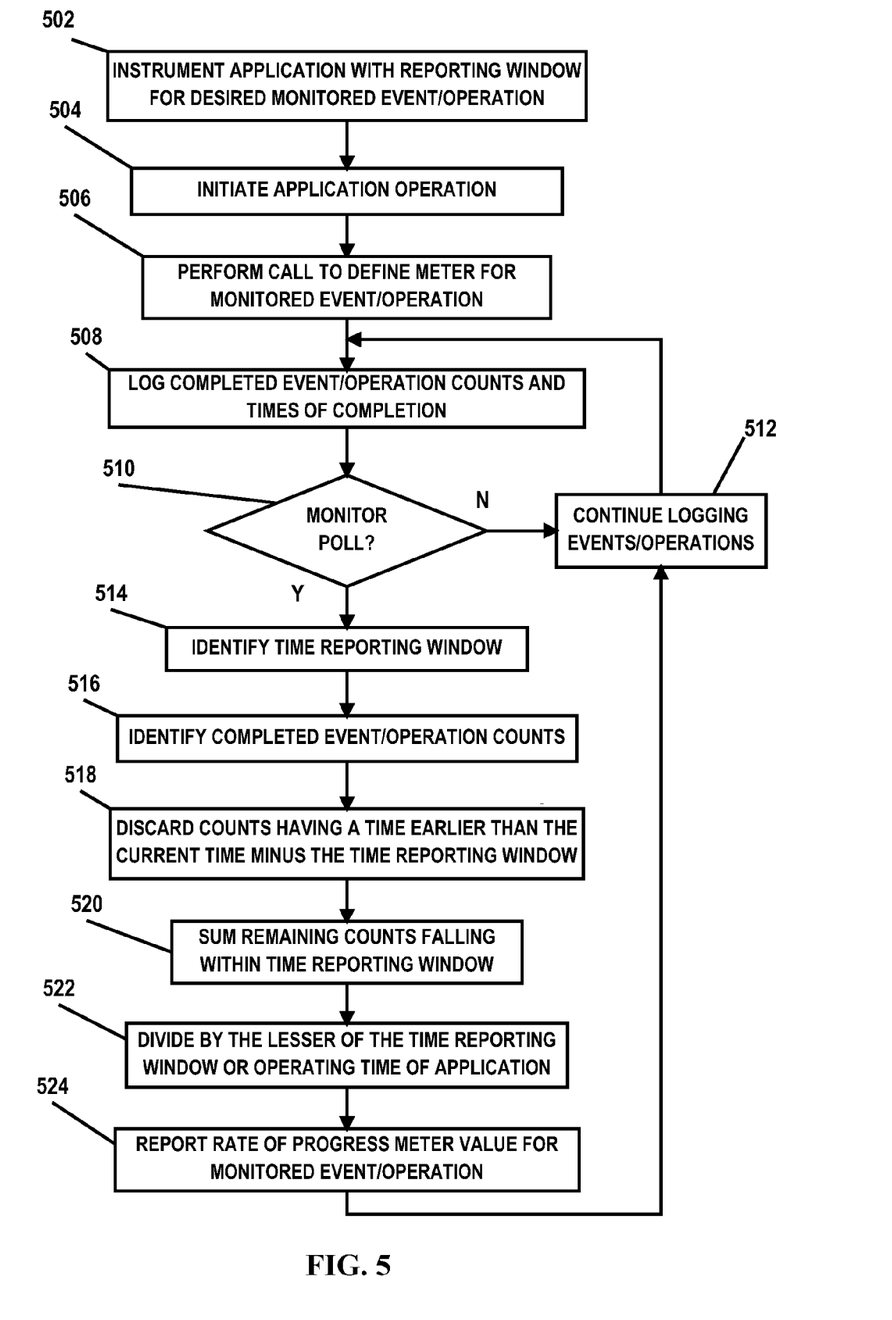
FIG. 5 is a flow diagram illustrating an embodiment of a method for rate of operation progress reporting according to the present disclosure.

FIG. 5 is a flow diagram illustrating an embodiment of a method for rate of operation progress reporting. The method begins at block 502, where a desired application (e.g., application 322) is instrumented with code defining a time reporting window 346 for a desired event/operation reported, processed and/or monitored by the application 322. At block 505, operation of the application 322 is initiated. At block 506, application 322 may perform an application programming interface (API) call to monitoring module 320 to define a meter 344 for the operation/event to be monitored/reported. At block 508, application 322 logs completed operation/event counts along with times of such completions (e.g., timestamps 354).

At decisional block 510, a determination is made whether monitoring module 320 has polled application 322 for an updated monitoring report. If not, the method proceeds to block 512, where application 322 continues logging completed operation/event counts. If at decisional block 510 it is determined that monitoring module 320 has polled application 322 for an updated report, the method proceeds to block 514, where the time reporting window 346 is identified. At block 516, the logged/stored operation/event counts are identified. At block 518, operation/event counts having a timestamp or occurring earlier than the current time minus the time of the reporting window 346 are discarded. At block 520, the remaining operation/event counts falling within the time reporting window 346 based on the current time are summed. At block 522, the summed operation/event counts are divided by the lesser of the time reporting window 346 or the operating time of application 322. At block 524, the rate of progress meter 344 value derived at block 522 is reported to monitoring module 320. The method then proceeds to block 512, where application 322 continues logging operations/events.

Thus, embodiments of the present disclosure enable batch operations to be reported using a floating time reporting window, thereby indicating a smoothed rate of progress value for the reported operations. For example, an application may be instrumented with code defining a particular time reporting window to be used for a particular event/operation to be monitored. The time reporting window may be varied for each particular event/operation to be monitored. In response to being polled by a monitoring module for an updated event/operation count/value, the instrumented application uses the time reporting window (e.g., instead of the interval from the last poll by the monitoring module) to compute a rate of progress meter value for the batch operations. Operation/event counts completed at a time earlier than the current time minus the time reporting window are discarded, and the remaining operation/event counts are summed. The summed value is then divided by the time reporting window (or the operating time of the application if less). Thus, embodiments of the present disclosure may effectively form a larger, fixed reporting window for batch operations than an interval used by an independent monitoring application, thereby providing more consistent results for a rate at which batch operations are being processed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
responsive to completion by an application of one or more batch operations, storing an operation count corresponding to each completed transaction of a respective batch operation; and
responsive to being polled by a monitoring module for the operation count according to a polling interval:
identifying a time reporting window for the batch operations, the time reporting window independent of and greater than the polling interval; and
reporting a rate of progress meter value for the batch operations to the monitoring module based on the operation counts and the time reporting window for a current polling interval, the rate of progress meter value indicating a rate of completed transactions of the respective batch operation for the current polling interval.

2. The method of claim 1, further comprising:
storing a timestamp corresponding to each completed operation count;
summing the operations counts having timestamps falling within the time reporting window; and
dividing the summed operation counts by the time reporting window to obtain the rate of progress meter value.

3. The method of claim 1, further comprising:
storing a timestamp corresponding to each completed operation count;
discarding operation counts having timestamps earlier than a current time minus the time reporting window;
summing remaining operation counts; and
dividing the summed operation counts by the time reporting window to obtain the rate of progress meter value.

4. The method of claim 1, further comprising:
storing a timestamp corresponding to each completed operation count;
summing the operations counts having timestamps falling within the time reporting window; and
dividing the summed operation counts by a lesser of the time reporting window or a time the application has been running to obtain the rate of progress meter value.

5. The method of claim 1, further comprising:
discarding operation counts having a completion time earlier than a current time minus the time reporting window;
summing remaining operation counts; and
dividing the summed operation counts by the time reporting window to obtain the rate of progress meter value.

6. The method of claim 1, further comprising:
discarding operation counts having a completion time earlier than a current time minus the time reporting window;
summing remaining operation counts; and
dividing the summed operation counts by a lesser of the time reporting window or a time the application has been running to obtain the rate of progress meter value.

7. A system, comprising:
a processor;
an application executable by the processor to:
responsive to completion of one or more batch operations, store an operation count corresponding to each completed transaction of a respective batch operation; and
responsive to being polled by a monitoring module for the operation count according to a polling interval:
identify a time reporting window for the batch operations, the time reporting window independent of and greater than the polling interval; and
report a rate of progress meter value for the batch operations to the monitoring module based on the operation counts and the time reporting window for a current polling interval, the rate of progress meter value indicating a rate of completed transactions of the respective batch operation for the current polling interval.

8. The system of claim 7, wherein the application is operable to:
store a timestamp corresponding to each completed operation count;
sum the operations counts having timestamps falling within the time reporting window; and
divide the summed operation counts by the time reporting window to obtain the rate of progress meter value.

9. The system of claim 7, wherein the application is operable to:
store a timestamp corresponding to each completed operation count;
discard operation counts having timestamps earlier than a current time minus the time reporting window;
sum remaining operation counts; and
divide the summed operation counts by the time reporting window to obtain the rate of progress meter value.

10. The system of claim 7, wherein the application is operable to:
store a timestamp corresponding to each completed operation count;
sum the operations counts having timestamps falling within the time reporting window; and
divide the summed operation counts by a lesser of the time reporting window or a time the application has been running to obtain the rate of progress meter value.

11. The system of claim 7, wherein the application is operable to:
discard operation counts having a completion time earlier than a current time minus the time reporting window;
sum remaining operation counts; and
divide the summed operation counts by the time reporting window to obtain the rate of progress meter value.

12. The system of claim 7, wherein the application is operable to:
discard operation counts having a completion time earlier than a current time minus the time reporting window;
sum remaining operation counts; and
divide the summed operation counts by a lesser of the time reporting window or a time the application has been running to obtain the rate of progress meter value.

13. A computer program product for reporting a rate of operation progress, the computer program product comprising:
a non-transitory computer readable storage medium having computer readable program code embodied therewith, the computer readable program code comprising computer readable program code configured to:
responsive to completion of one or more batch operations, store an operation count corresponding to each completed transaction of a respective batch operation; and
responsive to being polled by a monitoring module for the operation count according to a polling interval:
identify a time reporting window for the batch operations, the time reporting window independent of and greater than the polling interval; and
report a rate of progress meter value for the batch operations to the monitoring module based on the operation counts and the time reporting window for a current polling interval, the rate of progress meter value indicating a rate of completed transactions of the respective batch operation for the current polling interval.

14. The computer program product of claim 13, wherein the computer readable program code is configured to:
store a timestamp corresponding to each completed operation count;
sum the operations counts having timestamps falling within the time reporting window; and
divide the summed operation counts by the time reporting window to obtain the rate of progress meter value.

15. The computer program product of claim 13, wherein the computer readable program code is configured to:
store a timestamp corresponding to each completed operation count;
discard operation counts having timestamps earlier than a current time minus the time reporting window;
sum remaining operation counts; and
divide the summed operation counts by the time reporting window to obtain the rate of progress meter value.

16. The computer program product of claim 13, wherein the computer readable program code is configured to:
store a timestamp corresponding to each completed operation count;
sum the operations counts having timestamps falling within the time reporting window; and
divide the summed operation counts by a lesser of the time reporting window or a time the application has been running to obtain the rate of progress meter value.

17. The computer program product of claim 13, wherein the computer readable program code is configured to:
discard operation counts having a completion time earlier than a current time minus the time reporting window;
sum remaining operation counts; and
divide the summed operation counts by the time reporting window to obtain the rate of progress meter value.

18. The computer program product of claim 13, wherein the computer readable program code is configured to:

discard operation counts having a completion time earlier than a current time minus the time reporting window;
sum remaining operation counts; and
divide the summed operation counts by a lesser of the time reporting window or a time the application has been running to obtain the rate of progress meter value.

* * * * *